Oct. 13, 1925.  1,557,346
F. SCHWANHAUSSER
SENSITIZED ELEMENT AND MOUNTING THEREFOR
Filed May 6, 1921  2 Sheets-Sheet 2
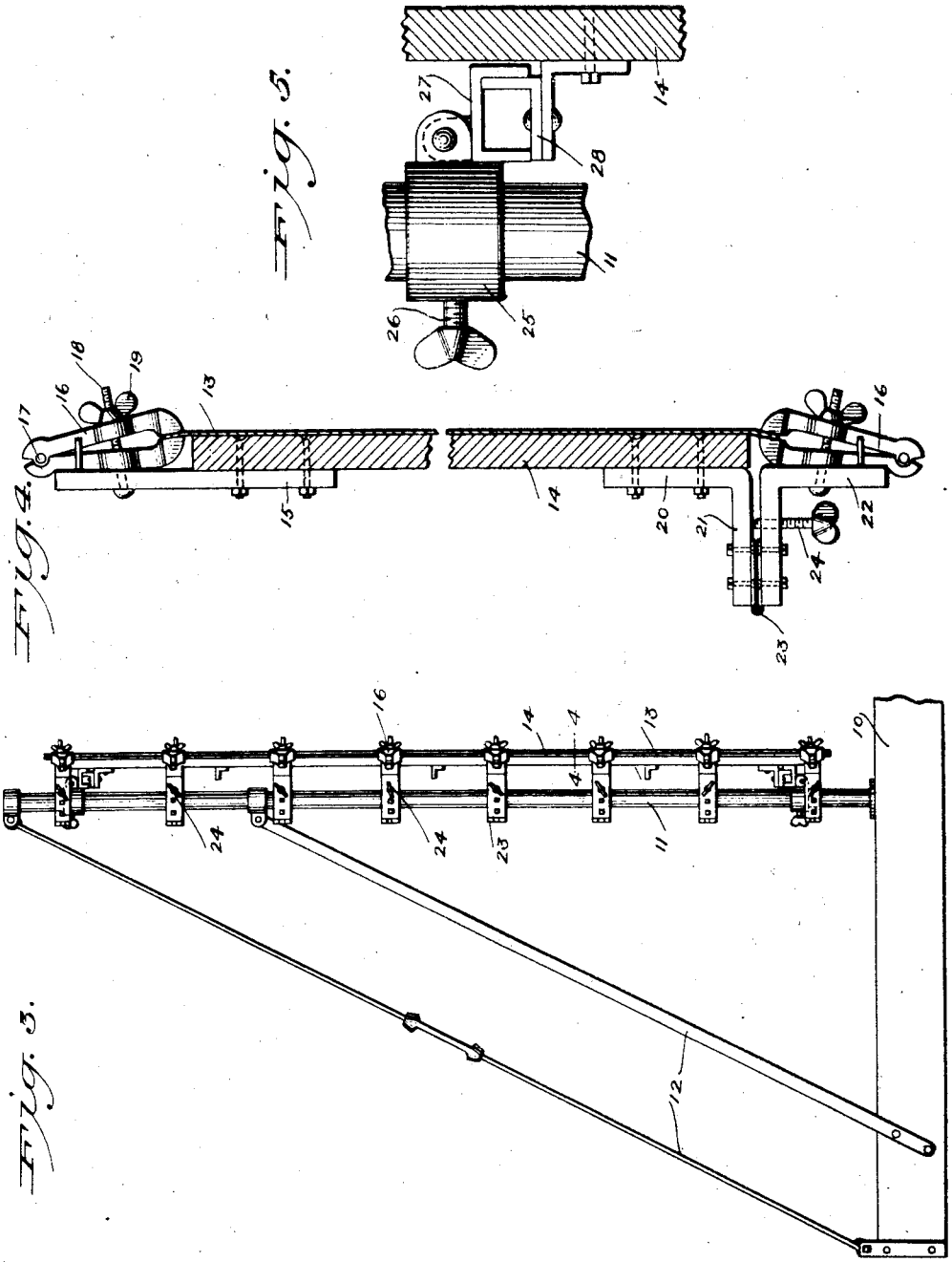

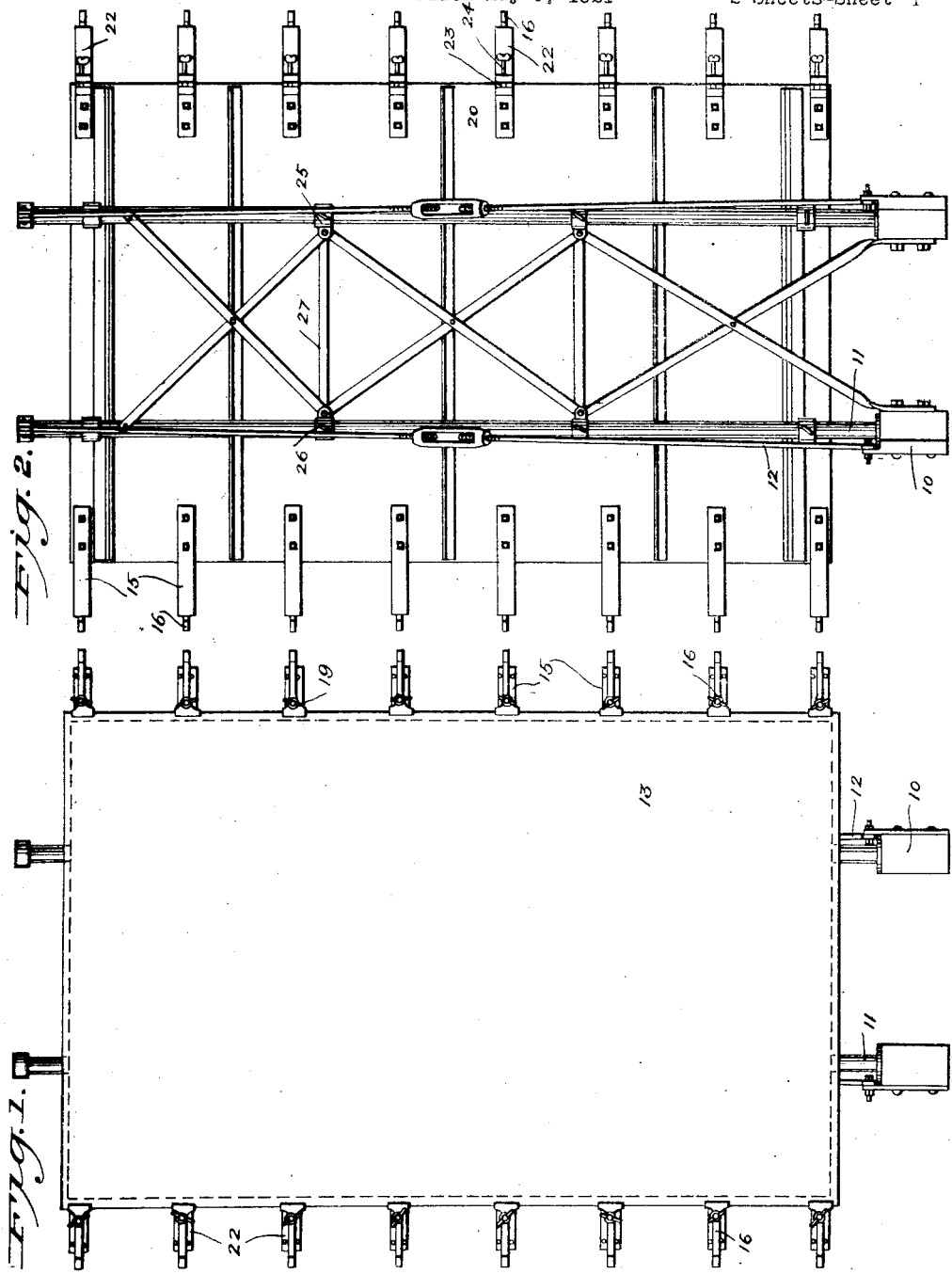

Patented Oct. 13, 1925.

1,557,346

UNITED STATES PATENT OFFICE.

FREDERICK SCHWANHAUSSER, OF NEW YORK, N. Y., ASSIGNOR TO RUSLING WOOD, OF NEW YORK, N. Y.

SENSITIZED ELEMENT AND MOUNTING THEREFOR.

Application filed May 6, 1921. Serial No. 467,220.

*To all whom it may concern:*

Be it known that I, FREDERICK SCHWAN-HAUSSER, a citizen of the United States, and a resident of the city of New York, borough of Manhattan, county of New York, and State of New York, have invented a new and original Sensitized Element and Mounting Therefor, of which the following is a full, clear, and exact description.

My invention relates to a mounting for a sensitized element, and aims to provide new and useful improvements in connection with such mounting.

As to such elements when utilized in photographic enlargement work it is well understood that difficulty has been experienced in connection with the surface against which the image is projected, not having all of its lines in exactly the same plane. Thus the distance between a lens and the surface varies in this respect, and however minute this variation might be the same results in a distortion of the image produced.

Furthermore the sensitized elements heretofore utilized have offered numerous objections incident to their unwieldy nature, and it has thus been difficult to handle these elements, aside from the fact that the weight of the same has tended to emphasize the distortion mentioned in the preceding paragraph.

Where relatively thin sensitized elements were utilized to overcome the objection incident to weight the distortion was such as to more than counter-act the beneficial results produced by the utilization of a light element, aside from the fact that these elements became more readily damaged.

With this in view, I have, while proposing a sensitized element of extremely light construction, readily handled, and incorporating wearing qualities effectually guarding against accidental damage, provided a mounting which when utilized in connection with the element aforementioned, will retain the same in such a manner as to present a smooth surface free from all unevenness, thus avoiding all distortion of the image.

Further objects of my invention will become apparent upon referring to the annexed specification taken in connection with the drawings which latter present one practical embodiment of the same, and in which—

Figure 1 is a front view of an element and mounting therefor constructed in accordance with my invention.

Figure 2 is a rear view of these parts.

Figure 3 is a side view of the same.

Figure 4 is an enlarged sectional view taken along the line 4—4 of Figure 3, and Figure 5 is a fragmentary detail view showing one of the elements forming a part of my improved construction.

In these views the reference numeral 10 indicates a supporting surface which may form a continuation of the supporting surface upon which the projecting apparatus rests, and securely carries columns 11 braced by the members 12.

As to the element proposed, I utilize a thin flexible sheet of aluminum 13 which is coated with a sensitized solution permitting of its being utilized for the purpose specified. Obviously a plate of this nature will be relatively easy to handle, and may be stored in a minimum amount of space, aside from the fact that its body will be incapable of being damaged in ordinary usage.

Due to the somewhat flexible nature of such a sheet of material, however, it will be seen that the same is liable to become distorted, and to avoid this objection attention is invited to Figures 1 to 4 which illustrate a structure overcoming this difficulty.

In these views the reference numeral 14 indicates a backing for the sheet of material 13 which backing is attached to the columns 11 in a manner hereinafter more fully specified.

A series of brackets 15 are arranged preferably along one of the side edges of the backing 14, and serve to support clamping members consisting of a pair of jaws 16 pivotally secured one to the other as at 17. An attachment of these clamping members to the bracket 15 is afforded by any suitable means such as a screw threaded bolt 18 extending transversely through the jaws 16, and each of the brackets 15, and a thumb screw 19 co-operates with the outer end of each of the bolts 18 and thus permits of the jaws 16 being moved one towards the other.

Adjacent the opposite side edge of the backing 14 and also upon the rear face thereof, brackets 20 are attached, which brackets terminate in arms 21 contrary to the brackets 15. A duplicate bracket 22 is hingedly secured as at 23 to the outer end of the bracket 20, and the outer end of this bracket mounts a clamping member of the nature aforedescribed. Further, a set screw or similar element 24 is associated with the bracket 22 and cooperates with one of the faces of the arm 21 of the bracket 20 whereby both of these latter brackets may be moved away from each other.

Thus upon a sensitive element 13 being arranged upon the outer face of the backing 14 the clamping members associated with the brackets 15 may be caused to engage the adjacent one of its edges. The clamping members mounted upon the arms 22 are also caused to engage the element 13 adjacent its opposite edge, subsequent to which the set screw 24 is tightened, which will obviously result in the arm 22 and clamping member carried thereby being moved away from the clamping members attached to the bracket 15. This operation will be continued until the element 13 becomes taut and free from all unevenness, thus obviously avoiding all objections incident to a distortion of the image.

It will be obvious that in some instances it might be desirable to remove the sensitized screen and elements carrying the same, as one unit, and if this is desired it will be noted that the operation may be accomplished by virtue of the fact, reference being had to Figure 5, that collars 25 are slidably mounted upon the columns 11 and that they may be retained at any desirable point in the length of these columns by means of a set screw 26 provided for this purpose. A channel iron 27 is carried by each pair of the collars 25 and the backing element 14 carries an angle iron 28 of a size permitting of its co-operation with the channel iron.

It will be noted that the structure thus provided is normally rigid in that a three-point suspension is furnished by the co-operation of the channel and angle irons, but it will be noted that a detachment of the packing element may be effected by simply sliding the collars 25 subsequent to the loosening of the screw 26 so that the angle irons are disengaged from the channel irons.

From the foregoing it will be seen that I have primarily provided a screen in the nature of a sensitized element which will overcome all objections incident to weight, it being also noted that by means of my improved type of mounting this screen will be properly held at all times during the exposure thereof.

Obviously numerous modifications of structure might readily be resorted to without in the least departing from the spirit of my invention, which I claim as:

1. A mounting, including a backing, brackets secured to the rear face of said backing and adjacent opposite side edges thereof, clamping members secured to said brackets, said clamping members each comprising a pair of jaws pivotally secured one to the other.

2. A mounting, including a backing, brackets secured to the rear face of said backing and adjacent opposite side edges thereof, one of said brackets comprising a plurality of parts hingedly secured one to the other, clamping members carried by said brackets, the brackets arranged along one of the side edges of said element comprising a plurality of parts movably secured together, and means for moving said parts with respect to each other.

3. A mounting, including a backing, brackets secured to the rear face of said backing and adjacent opposite side edges thereof, one of said brackets comprising a plurality of parts hingedly secured one to the other, clamping members carried by said brackets, the brackets arranged along one of the side edges of said element comprising a plurality of parts movably secured together, and a set screw secured to one of said bracket parts and cooperating with the same for moving said bracket parts with respect to each other.

4. A mounting, including a backing, a bracket secured to the rear face of said backing and adjacent opposite side edges thereof, certain of said brackets comprising a plurality of parts pivotally secured one to the other, set screws for positively moving one of said parts with respect to the other, and clamping members carried by said brackets, the clamping members carried by said multiple part brackets being secured adjacent the outermost ends thereof.

5. A mounting including a supporting column, a backing, means for detachably securing said backing to said column, a plurality of adjustable brackets secured to the rear face of said backing and adjacent the opposite side edges thereof, a sensitized element disposed across the front face of the backing, and adjustable clamps carried by said adjustable brackets adapted to clamp and tauten the sensitized element in a plurality of parallel and opposite directions through adjustment of the said brackets.

6. A mounting, including supporting columns, collars slidably secured to said supporting columns, means for retaining said collars in proper position, a backing and means for detachably securing said backing element to said collars.

7. A mounting, including supporting columns, collars slidably secured to said supporting columns, means for retaining said collars in proper position, a backing, and means constituting a three-point suspension co-operating with said collars and backing element.

8. A mounting, including supporting columns, collars slidably secured to said supporting columns, means for retaining said collars in proper position, a backing, a channel member secured to said collars, an angle iron carried by said backing element, said channel member being adapted to engage said angle member.

F. SCHWANHAUSSER.